(12) United States Patent
Tanaka et al.

(10) Patent No.: US 12,442,472 B2
(45) Date of Patent: Oct. 14, 2025

(54) PIPE JOINT, GLAND, AND METHOD FOR JOINING PIPES

(71) Applicant: KUBOTA CORPORATION, Osaka (JP)

(72) Inventors: Ryunosuke Tanaka, Amagasaki (JP); Keita Oda, Amagasaki (JP); Shozo Kishi, Amagasaki (JP)

(73) Assignee: DAIFUKU CO., LTD., Osaka (JP)

(*) Notice: Subject to any disclaimer, the term of this patent is extended or adjusted under 35 U.S.C. 154(b) by 6 days.

(21) Appl. No.: 18/034,968

(22) PCT Filed: Oct. 29, 2021

(86) PCT No.: PCT/JP2021/040119
§ 371 (c)(1),
(2) Date: May 2, 2023

(87) PCT Pub. No.: WO2022/097585
PCT Pub. Date: May 12, 2022

(65) Prior Publication Data
US 2023/0400128 A1    Dec. 14, 2023

(30) Foreign Application Priority Data
Nov. 6, 2020 (JP) .................. 2020-185472

(51) Int. Cl.
*F16L 21/04* (2006.01)
*F16L 21/08* (2006.01)

(52) U.S. Cl.
CPC .............. *F16L 21/04* (2013.01); *F16L 21/08* (2013.01)

(58) Field of Classification Search
CPC .................. F16L 21/04; F16L 21/08
(Continued)

(56) References Cited

U.S. PATENT DOCUMENTS 3,941,410 A * 3/1976 Miyaoka ................ F16L 21/04
7,354,073 B2 4/2008 Sakamoto
(Continued)

FOREIGN PATENT DOCUMENTS

EP    4043772 B1    6/2024
JP    S59-217090 A   12/1984
(Continued)

OTHER PUBLICATIONS

Machine Translation of JP 2014-5868 (Year: 2014).*
(Continued)

*Primary Examiner* — Zachary T Dragicevich
(74) *Attorney, Agent, or Firm* — RENNER, OTTO, BOISSELLE & SKLAR, LLP

(57) ABSTRACT

A pipe joint is provided in which a seal member insertion space 14 is formed between a first tapered surface 8 of a socket 5 and an outer circumference of a spigot 3, a seal member 15 is inserted into the seal member insertion space 14, and a gland 17 that presses the seal member 15 into the seal member insertion space 14 is externally fitted to the spigot 3. The seal member 15 has a bulb part 26 at one end part thereof. A guide part 29 that guides the bulb part 26 from an opening end face 16 of the socket 5 into the seal member insertion space 14 is formed on the inner circumference of the socket 5. The guide part 29 has a second tapered surface 30. An angle of inclination of the second tapered surface 30 is greater than an angle of inclination of the first tapered surface 8.

6 Claims, 18 Drawing Sheets

(58) Field of Classification Search
USPC .......................................................... 285/337
See application file for complete search history.

(56) References Cited

U.S. PATENT DOCUMENTS

| | | | |
|---|---|---|---|
| 10,006,572 | B2 | 6/2018 | Kishi et al. |
| 2011/0278835 | A1 | 11/2011 | Kishi et al. |
| 2015/0292656 | A1 | 10/2015 | Kishi et al. |
| 2015/0362103 | A1* | 12/2015 | Kishi ..................... F16L 21/04 |
| 2019/0137017 | A1 | 5/2019 | Ishihara et al. |
| 2020/0208765 | A1* | 7/2020 | Kishi ..................... F16L 21/04 |

FOREIGN PATENT DOCUMENTS

| | | | |
|---|---|---|---|
| JP | H6-043470 | U1 | 6/1994 |
| JP | H9-144962 | A | 6/1997 |
| JP | 2003-222276 | A | 8/2003 |
| JP | 2010-286110 | A | 12/2010 |
| JP | 2014-005868 | A | 1/2014 |
| JP | 2017-180472 | A | 10/2017 |

OTHER PUBLICATIONS

International Search Report from corresponding International Patent Application No. PCT/JP2021/040119, dated Dec. 28, 2021.
Extended European Search Report issued in European Patent Application No. 21889138.0 dated Apr. 22, 2024.
Office Action issued in related European Patent Application No. 21889138.0 dated Aug. 21, 2025.

* cited by examiner

PIPE JOINT, GLAND, AND METHOD FOR JOINING PIPES

TECHNICAL FIELD OF THE INVENTION

The present invention relates to a pipe joint in which a spigot formed in one pipe is inserted into a socket formed in another pipe, a gland used in the pipe joint, and a method for joining pipes.

BACKGROUND OF THE INVENTION

A pipe joint 110 illustrated in FIG. 16 is already known. The pipe joint 110 is configured as follows. A spigot 102 formed in one pipe 101 is inserted into a socket 104 formed in another pipe 103. A first tapered surface 105 that decreases in diameter progressively toward the back side of the socket 104 is formed on the inner circumference of the socket 104. A seal member insertion space 106 is formed throughout the entire circumference between the first tapered surface 105 and the outer circumference of the spigot 102. An annular seal member 107 that seals between the inner circumference of the socket 104 and the outer circumference of the spigot 102 is inserted into the seal member insertion space 106. A gland 109 that presses the seal member 107 from an opening end face 108 of the socket 104 into the seal member insertion space 106 is externally fitted to the spigot 102, and faces the opening end face 108 of the socket 104 from the outside.

Further, at a position that is further toward the back side of the socket 104 than the seal member insertion space 106, a socket protrusion 111 that protrudes inward in a pipe diameter direction B from the inner circumference of the socket 104 is formed over the entire circumference. A lock ring 112 is accommodated at a position that is further toward the back side of the socket 104 than the socket protrusion 111.

The spigot 102 passes through the lock ring 112, and a spigot protrusion 113 is formed over the entire circumference on the outer circumference of a tip portion of the spigot 102. The spigot protrusion 113 is capable of engaging with the lock ring 112 from the back side of the socket 104 in a separation direction 120 of the one pipe 101. By this means, the spigot 102 is prevented from separating from the socket 104 during the occurrence of an earthquake or the like.

As illustrated in FIG. 16 and FIG. 17, the gland 109 is attached to the socket 104 through a plurality of bolts 114 and nuts 115. The bolts 114 are inserted through bolt insertion holes 116 formed in the gland 109. These bolts 114, nuts 115, and bolt insertion holes 116 are formed at predetermined intervals, respectively, in a pipe circumference direction G. Further, a plurality of protrusions 117 are provided in the gland 109. Each of these protrusions 117 is located further outward in the pipe diameter direction B than the bolt insertion holes 116.

The seal member 107 has, at one end part in an insertion direction C, a bulb part 118 which is compressed in the pipe diameter direction B and exerts a sealing function.

According to the configuration described above, the seal member 107 and the gland 109 are externally fitted to the one pipe 101, the spigot 102 is inserted into the socket 104, and centering is performed to align the central axis of the one pipe 101 with the central axis of the other pipe 103. In this state, the bolts 114 and the nuts 115 are tightened, and the seal member 107 is pressed from the opening end face 108 of the socket 104 into the seal member insertion space 106 by the gland 109.

As illustrated in FIG. 16, by tightening the bolts 114 and the nuts 115 until the protrusions 117 of the gland 109 come in contact with the opening end face 108 of the socket 104, the occurrence of a situation in which the seal member 107 is pressed with an excessive force can be prevented. In this way, the one pipe 101 is joined to the other pipe 103.

Japanese Patent Laid-Open No. 2010-286110 can be referred to for a description regarding the pipe joint 110 described above.

However, in the conventional form described above, when joining the one pipe 101 to the other pipe 103, for example, as illustrated in FIG. 17, in a case where uneven tightening is performed in which control of the tightening torque is not performed by, in sequence, initially tightening the bolt 114 and the nut 115 at the highest position M1 of the pipe joint 110, and thereafter tightening the bolts 114 and the nuts 115 at lower positions M2 to M4 in that order, and finally tightening the bolt 114 and the nut 115 at the lowest position M5 of the pipe joint 110, in some cases the seal member 107 may be stretched and, at the lower part of the pipe joint 110, the seal member 107 may be slackened in the downward direction. If the seal member 107 is slackened in this way, a problem such that the bulb part 118 of the seal member 107 cannot be inserted into the seal member insertion space 106 may occur. Therefore, in the conventional form, it is necessary to perform tightening in a manner so that the tightening torque is equal at all of the bolts 114 and the nuts 115, and consequently it takes time to perform the work to tighten the bolts 114 and the nuts 115.

Further, if the bolts 114 and the nuts 115 are tightened too much, there is a risk that an excessive tightening force will act on the gland 109 and, as illustrated in FIG. 18, the inner circumferential side of the gland 109 will deform and approach the opening end face 108 of the socket 104. In addition, after the spigot 102 has been inserted into the socket 104, as illustrated in FIG. 19, when the spigot 102 is bent at a predetermined bending angle θ with respect to the socket 104, there is a risk that the outer circumference of the spigot 102 will come in contact with the inner circumference of the gland 109, and the inner circumferential side of the gland 109 will deform and approach the opening end face 108 of the socket 104.

An object of the present invention is to provide a pipe joint in which a seal member can be reliably pressed into a seal member insertion space by a gland, and in which it is possible to prevent deformation of the gland, and in which control of the tightening torque of fasteners is not necessary, and to also provide a gland and a method for joining pipes.

SUMMARY OF THE INVENTION

A pipe joint of the present invention is a pipe joint, wherein:
- a spigot formed in one pipe is inserted into a socket formed in another pipe;
- a first tapered surface that decreases in diameter progressively toward a rear side of the socket is formed on an inner circumference of the socket;
- a seal member insertion space is formed throughout an entire circumference between the first tapered surface and an outer circumference of the spigot, and an annular seal member which seals between the inner circumference of the socket and the outer circumference of the spigot is inserted into the seal member insertion space;
- a gland for pressing the seal member from an opening end face of the socket into the seal member insertion space is externally fitted to the spigot and faces the opening end face of the socket from outside;

the gland is attached to the socket through a plurality of fasteners;

the seal member has, at one end part in an insertion direction, a bulb part that is compressed in a pipe diameter direction and exerts a sealing function;

a guide part for guiding the bulb part of the seal member from the opening end face of the socket into the seal member insertion space is formed on the inner circumference of the socket;

the guide part has a second tapered surface which decreases in diameter progressively toward the rear side of the socket;

the second tapered surface is formed between the opening end face and the first tapered surface of the socket in a pipe axis direction; and an angle of inclination of the second tapered surface with respect to a pipe central axis is greater than an angle of inclination of the first tapered surface with respect to the pipe central axis.

According to the configuration described above, when the seal member is pressed into the seal member insertion space by the gland, the bulb part of the seal member is guided into the seal member insertion space from the opening end face of the socket by the second tapered surface of the guide part.

By this means, even in a case where the fasteners are unevenly tightened when attaching the gland to the socket, and the seal member stretches and slackens, since the bulb part of the seal member is guided from the opening end face of the socket into the seal member insertion space by the second tapered surface of the guide part, the seal member can be reliably pressed into the seal member insertion space by the gland. Therefore, it is not necessary to perform tightening so that the tightening torque is equal at all of the fasteners, and control of the tightening torque of the fasteners is not necessary, and hence the time required to perform work to tighten the fasteners can be shortened.

According to the pipe joint of the present invention, preferably, when the seal member is inserted into the seal member insertion space in a state in which the seal member is externally fitted to the spigot, a bulb center part between an inner circumference and an outer circumference in the pipe diameter direction of the bulb part of the seal member is located further inward in the pipe diameter direction than an end part of the second tapered surface on an opening end face side of the socket.

According to the configuration described above, because the bulb center part of the seal member is located further inward in the pipe diameter direction than an end part of the second tapered surface, even if the fasteners are unevenly tightened when attaching the gland to the socket, and the seal member stretches and slackens in the pipe diameter direction, the bulb part of the seal member will be reliably guided from the opening end face of the socket into the seal member insertion space by the second tapered surface of the guide part.

According to the pipe joint of the present invention, preferably, in a case where a minimum clearance portion where a clearance between the outer circumference of the spigot and the inner circumference of the socket is a minimum of an allowable range arises, a relation that the bulb center part is located further inward in the pipe diameter direction than the end part of the second tapered surface on the opening end face side of the socket is also maintained in the minimum clearance portion.

According to the configuration described above, in a case where a minimum clearance portion arises due to the central axis of one pipe deviating in the pipe diameter direction with respect to the central axis of the other pipe or due to one pipe bending with respect to the other pipe, the bulb center part of the seal member is located further inward in the pipe diameter direction than the end part of the second tapered surface also in the minimum clearance portion. By this means, even in a case where the fasteners are unevenly tightened when attaching the gland to the socket, the bulb part of the seal member is reliably guided from the opening end face of the socket into the seal member insertion space by the second tapered surface of the guide part.

According to the pipe joint of the present invention, preferably:

a fastener insertion hole through which a fastener is inserted, a toric first protrusion that comes in contact with the opening end face of the socket, and a concave portion that is surrounded by the first protrusion are provided in the gland;

the first protrusion is formed further inward than the fastener insertion hole in the pipe diameter direction;

another end part in a separation direction of the seal member is fitted into the concave portion of the gland; and a diameter of the end part of the second tapered surface on an opening end face side of the socket is smaller than an internal diameter of the first protrusion of the gland.

According to the configuration described above, when the seal member is pressed into the seal member insertion space by the gland, since the other end part of the seal member is fitted into the concave portion of the gland, the other end part of the seal member can be prevented from becoming misaligned and turning over in the pipe diameter direction.

According to the pipe joint of the present invention, preferably a clearance that is surrounded by an inner circumferential surface of the first protrusion, the second tapered surface, and an outer circumferential surface of the seal member is formed.

According to the configuration described above, when the seal member is pressed into the seal member insertion space by the gland, even if the seal member is deformed outward in the pipe diameter direction, by the seal member escaping into the clearance, the occurrence of a situation in which the seal member is pinched between the first protrusion of the gland and the opening end face of the socket can be prevented.

A gland used in the pipe joint according to the present invention is a gland wherein:

a second protrusion that comes in contact with the opening end face of the socket is formed; and the second protrusion is formed further outward than the first protrusion in the pipe diameter direction.

According to the configuration described above, when fasteners are inserted through the fastener insertion holes and the gland is attached to the socket, even if an excessive fastening force acts on the gland, because the first protrusion and the second protrusion each come in contact with the opening end face of the socket, deformation of the gland can be prevented.

Further, after the spigot is inserted into the socket, when the spigot is bent at a predetermined angle with respect to the socket, even if the outer circumference of the spigot comes in contact with the inner circumference of the gland, deformation of the gland can be prevented by the first protrusion and the second protrusion each coming in contact with the opening end face of the socket.

According to the gland of the present invention, preferably,
- a plurality of the fastener insertion holes and a plurality of the second protrusions are each formed at predetermined intervals in a pipe circumference direction;
- the second protrusions are formed further outward than the fastener insertion holes in the pipe diameter direction;
- a plurality of outer circumferential concave portions which are recessed inwardly in the pipe diameter direction are formed in an outer circumferential edge of the gland; and
- the outer circumferential concave portion enters between the fastener insertion hole and an adjacent fastener insertion hole from the outer circumferential edge of the gland.

According to the configuration described above, because a plurality of outer circumferential concave portions are formed in the outer circumferential edge of the gland, the weight of the gland can be reduced in comparison to a gland in which the outer circumferential concave portions are not formed.

According to the gland of the present invention, preferably a configuration is adopted so that a width in the pipe diameter direction from an inner circumference to an outer circumference of the first protrusion is equal to or greater than a width in the pipe diameter direction from the outer circumference of the first protrusion to the outer circumferential concave portion.

According to the configuration described above, the strength of the gland can be sufficiently maintained even when a plurality of outer circumferential concave portions are formed in the outer circumferential edge of the gland.

A method for joining pipes of the present invention is a method for joining pipes in a pipe joint, wherein:
in the pipe joint,
- a spigot formed in one pipe is inserted into a socket formed in another pipe,
- a first tapered surface that decreases in diameter progressively toward a rear side of the socket is formed on an inner circumference of the socket,
- a seal member insertion space is formed throughout an entire circumference between the first tapered surface and an outer circumference of the spigot, and an annular seal member which seals between the inner circumference of the socket and the outer circumference of the spigot is inserted into the seal member insertion space,
- a gland for pressing the seal member from an opening end face of the socket into the seal member insertion space is externally fitted to the spigot and faces the opening end face of the socket from outside,
- the gland is attached to the socket through a plurality of fasteners,
- the seal member has, at one end part in an insertion direction, a bulb part that is compressed in a pipe diameter direction and exerts a sealing function,
- a guide part for guiding the bulb part of the seal member from the opening end face of the socket into the seal member insertion space is formed on the inner circumference of the socket,
- the guide part has a second tapered surface which decreases in diameter progressively toward the rear side of the socket, and
- the second tapered surface is formed between the opening end face and the first tapered surface of the socket in a pipe axis direction, the method for joining pipes including:
- in a state in which the seal member and the gland are externally fitted to the one pipe, inserting the spigot into the socket of the other pipe,
- fitting another end part in a separation direction of the seal member into a concave portion formed in the gland, and
- in a state in which a bulb center part between an inner circumference and an outer circumference in the pipe diameter direction of the bulb part of the seal member is positioned further inward in the pipe diameter direction than an end part on an opening end face side of the socket of the second tapered surface, tightening the fasteners and pressing the seal member from the opening end face of the socket into the seal member insertion space with the gland.

The method for joining pipes of the present invention preferably includes:
- inserting the spigot into the socket of the other pipe, and
- in a case where a minimum clearance portion where a clearance between the outer circumference of the spigot and the inner circumference of the socket is a minimum of an allowable range arises, fitting the other end part of the seal member into the concave portion of the gland, and in the minimum clearance portion also, positioning the bulb center part of the bulb part further inward in the pipe diameter direction than the end part on the opening end face side of the socket of the second tapered surface.

According to the present invention described above, when the seal member is pressed into the seal member insertion space by the gland, the bulb part of the seal member is guided into the seal member insertion space from the opening end face of the socket by the second tapered surface of the guide part. Therefore, in a case where the fasteners are unevenly tightened when attaching the gland to the socket, even if the seal member stretches and slackens, because the bulb part of the seal member is guided from the opening end face of the socket into the seal member insertion space by the second tapered surface of the guide part, the seal member can be reliably pressed into the seal member insertion space by the gland. Further, it is not necessary to perform tightening so that the tightening torque is equal at all of the fasteners, and control of the tightening torque of the fasteners is not necessary, and hence the time required to perform work to tighten the fasteners can be shortened.

DETAILED DESCRIPTION OF THE INVENTION

Hereunder, embodiments of the present invention are described with reference to the accompanying drawings.

First Embodiment

Figure 1:
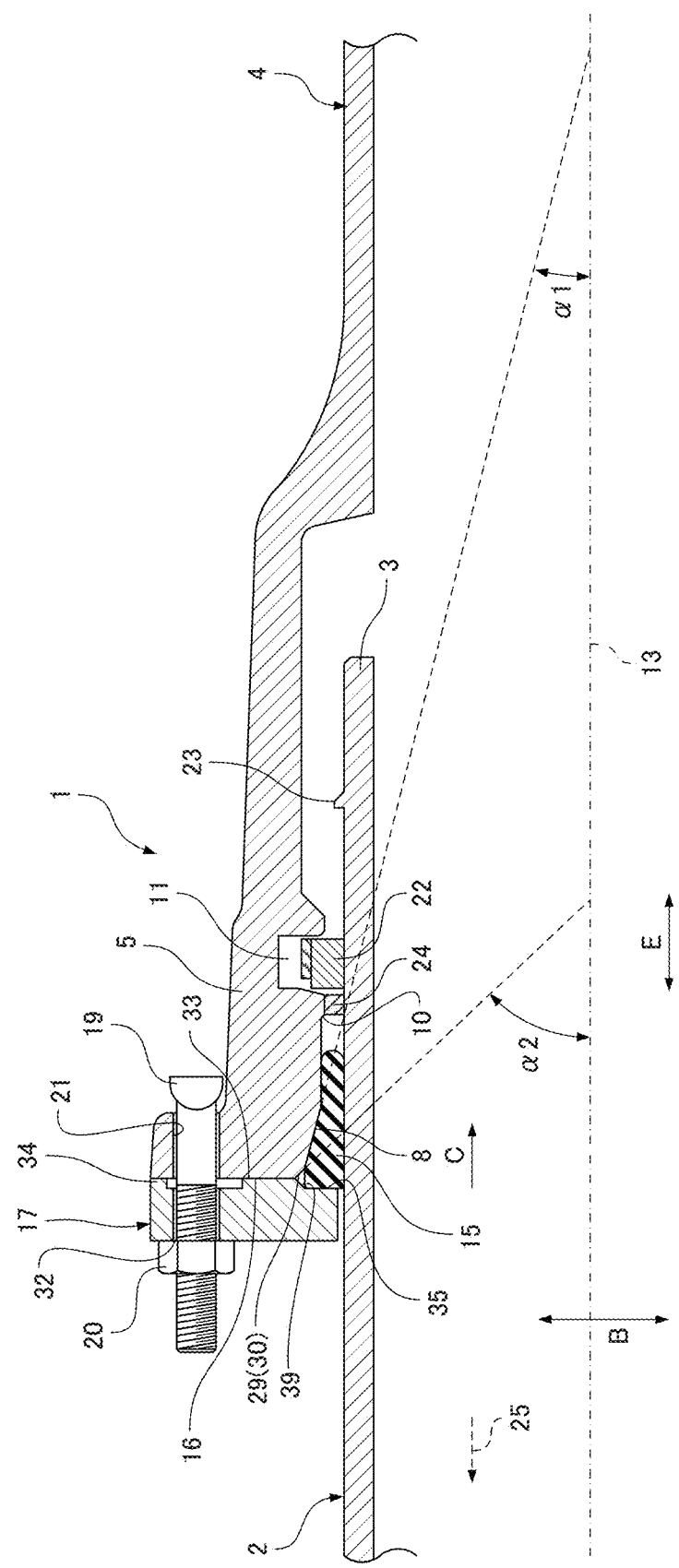
FIG. 1 is a cross-sectional view of an upper part of a pipe joint in a first embodiment of the present invention.
Figure 2:
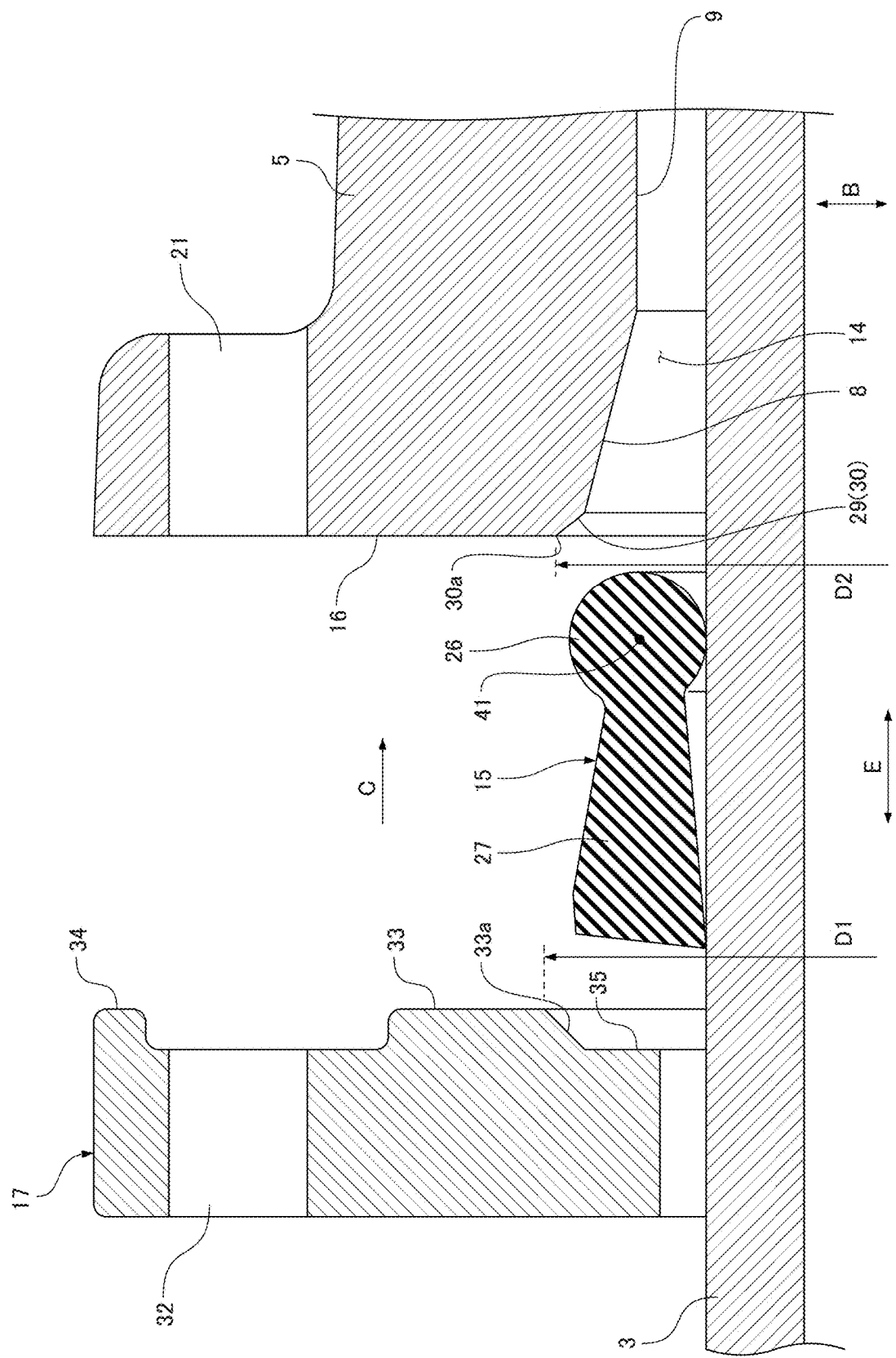
FIG. 2 is a partial enlarged cross-sectional view of a spigot, a socket, a seal member, and a gland of the pipe joint in the first embodiment of the present invention, and illustrates a state immediately before inserting the seal member into a seal member insertion space.

In a first embodiment, as illustrated in FIG. 1 and FIG. 2, a pipe joint 1 is constituted by inserting a spigot 3 formed in one pipe 2 into a socket 5 formed in another pipe 4.

A first tapered surface 8, a straight surface 9, a socket protrusion 10, and a lock ring accommodating groove 11 are formed on the inner circumference of the socket 5. The first tapered surface 8 decreases in diameter progressively toward the rear side of the socket 5. The straight surface 9 is parallel to a pipe central axis 13 of the pipe 4, and is continuous from a back end part of the first tapered surface 8 to the back side of the socket 5.

A seal member insertion space 14 is formed throughout the entire circumference between the first tapered surface 8 and the outer circumference of the spigot 3. An annular seal member 15 that seals between the inner circumference of the socket 5 and the outer circumference of the spigot 3 is inserted into the seal member insertion space 14.

A gland 17 that presses the seal member 15 from an opening end face 16 of the socket 5 into the seal member insertion space 14 is externally fitted to the spigot 3, and faces the opening end face 16 of the socket 5 from the outside. The gland 17 is attached to the socket 5 through a plurality of T-head bolts 19 (one example of a fastener) and nuts 20 (one example of a fastener).

A plurality of bolt holes 21 through which the T-head bolts 19 are inserted are formed in the socket 5.

The lock ring accommodating groove 11 is formed further toward the back side of the socket 5 than the seal member insertion space 14. A lock ring 22 is accommodated in the lock ring accommodating groove 11. The lock ring 22 is a ring having a split structure in which one portion has been cut. The lock ring 22 has elasticity such that the diameter thereof is expanded by expanding the width of the cut portion with a diameter expander (not illustrated in the drawings), and the diameter thereof is reduced to return to the original diameter by removing the diameter expander from the cut portion.

The spigot 3 passes through the lock ring 22. A spigot protrusion 23 is formed over the entire circumference on the outer circumference of a tip portion of the spigot 3. The spigot protrusion 23 can engage with the lock ring 22 from the back side of the socket 5 in a separation direction 25 of the one pipe 2, and by this means the spigot 3 is prevented from separating from the socket 5 during the occurrence of an earthquake or the like.

The socket protrusion 10 protrudes inward in a pipe diameter direction B from the inner circumference of the socket 5, and is formed over the entire circumference between the seal member insertion space 14 and the lock ring accommodating groove 11. A centering ring 24 is fitted into a space between the inner circumference of the socket protrusion 10 and the outer circumference of the spigot 3. The centering ring 24 is a ring having a split structure in which one portion has been cut, and is made of a material that has elasticity, such as resin.

The seal member 15 is a ring made of rubber, and has a bulb part 26 having a circular cross section that is provided at one end part in an insertion direction C, and a base part 27 having a trapezoidal cross section that is provided integrally with the bulb part 26. As illustrated in FIG. 1, in a state in which the seal member 15 is inserted into the seal member insertion space 14, the bulb part 26 is compressed in the pipe diameter direction B and exerts a sealing function.

A guide part 29 that guides the bulb part 26 of the seal member 15 from the opening end face 16 of the socket 5 into the seal member insertion space 14 is formed on the inner circumference of the socket 5. The guide part 29 has a second tapered surface 30 that decreases in diameter progressively toward the rear side of the socket 5. The second tapered surface 30 is formed over the entire circumference between the opening end face 16 and the first tapered surface 8 of the socket 5 in a pipe axis direction E. As illustrated in FIG. 1, an angle of inclination $\alpha 2$ of the second tapered surface 30 with respect to the pipe central axis 13 is greater than an angle of inclination $\alpha 1$ of the first tapered surface 8 with respect to the pipe central axis 13.

As illustrated in FIG. 3 to FIG. 6, a plurality of bolt insertion holes 32 (one example of a fastener insertion hole) through which the T-head bolts 19 are inserted, a toric first protrusion 33 which comes in contact with the opening end face 16 of the socket 5, a plurality of second protrusions 34 which come in contact with the opening end face 16, and a concave portion 35 which is surrounded by the first protrusion 33 are provided in the gland 17.

The first protrusion 33, the second protrusions 34, and the concave portion 35 are formed on a joining face side of the gland 17 that faces the opening end face 16 of the socket 5.

Figure 9:
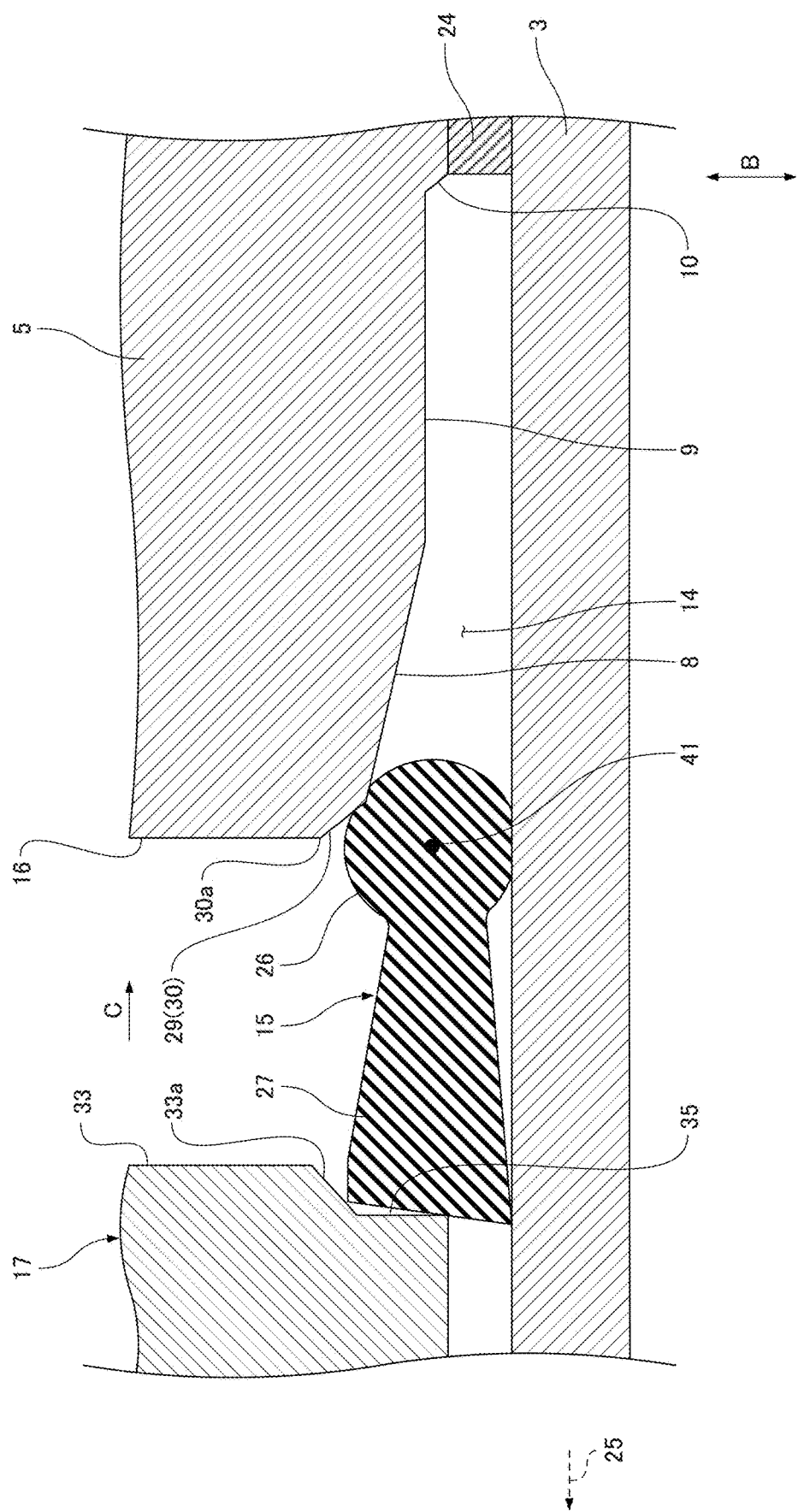
FIG. 9 is a partial enlarged cross-sectional view illustrating the method for joining pipes in the pipe joint in the first embodiment of the present invention, and illustrates a state when the seal member has started to be inserted into the seal member insertion space.

The first protrusion 33 is formed further inward than the bolt insertion holes 32 in the pipe diameter direction B. As illustrated in FIG. 1 and FIG. 9, the other end part in the separation direction 25 of the base part 27 of the seal member 15 is fitted into the concave portion 35 of the gland 17.

Figure 3:
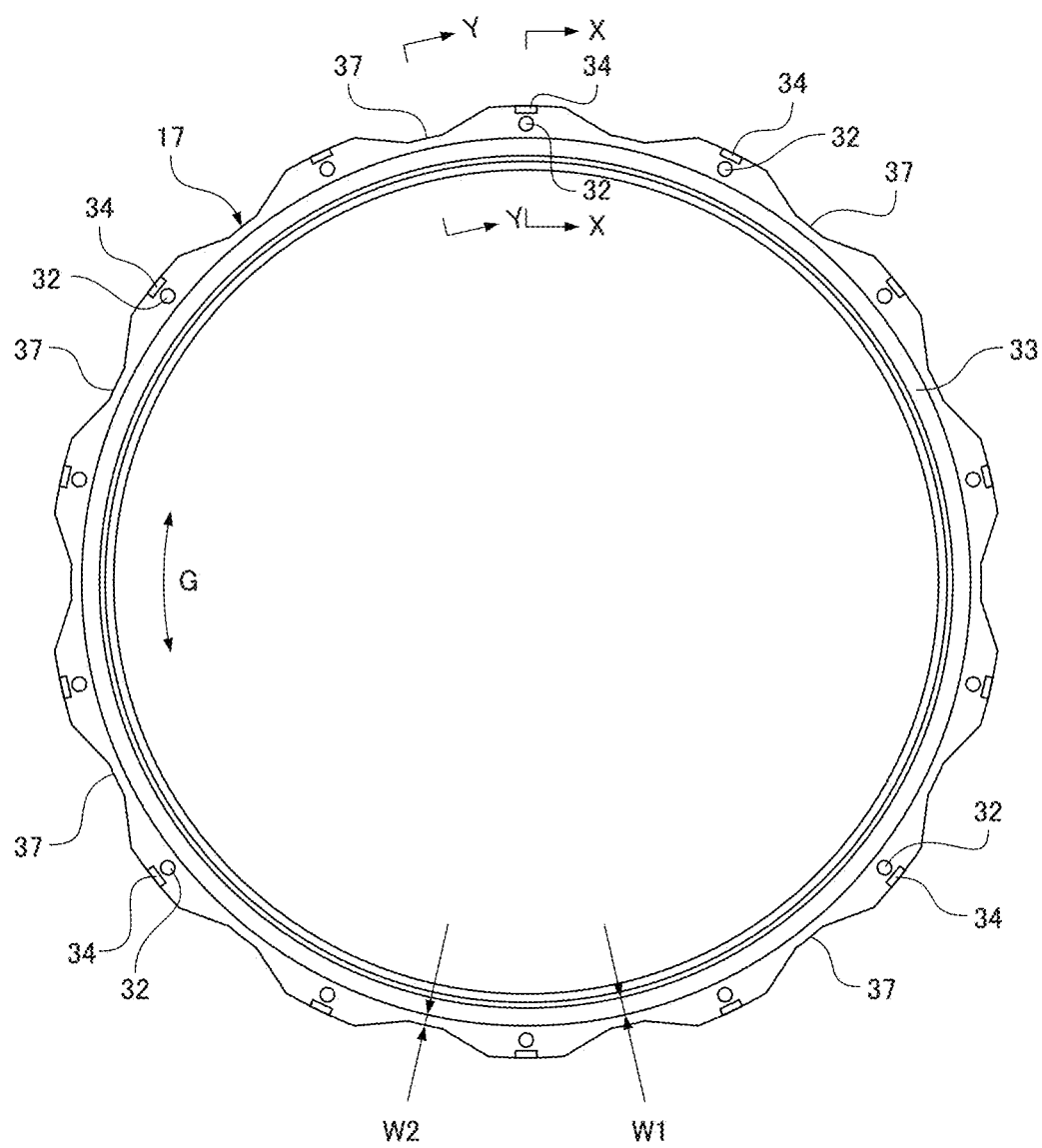
FIG. 3 is a front view of the gland of the pipe joint in the first embodiment of the present invention.
Figure 4:
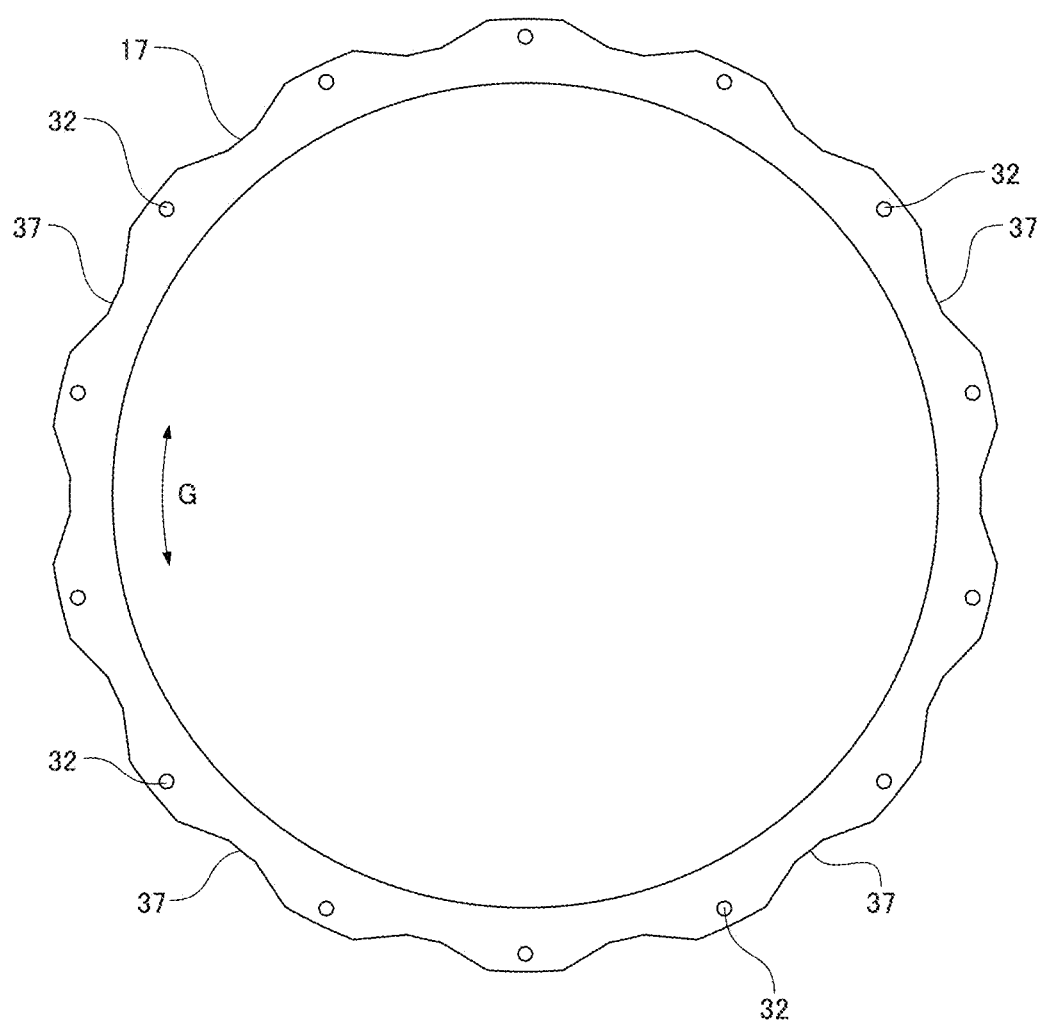
FIG. 4 is a rear view of the gland of the pipe joint in the first embodiment of the present invention.
Figure 5:
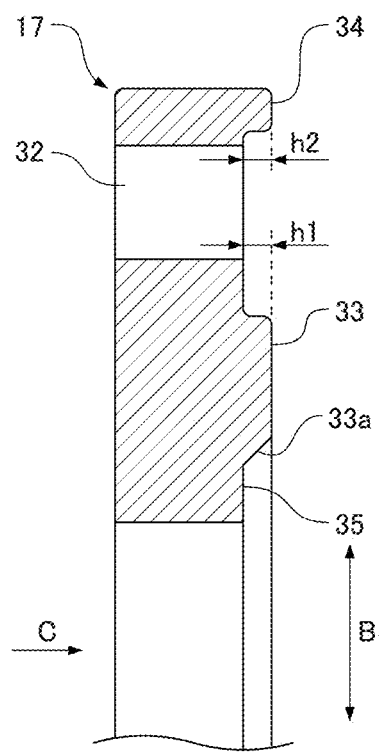
FIG. 5 is a perspective view along the direction of arrows X-X in FIG. 3.

As illustrated in FIG. 3 and FIG. 4, the bolt insertion holes 32 and the second protrusions 34 are formed at predetermined intervals, respectively, in the pipe circumference direction G. In addition, the second protrusions 34 are formed further outward than the bolt insertion holes 32 in the pipe diameter direction B. As illustrated in FIG. 5, a height h1 of the first protrusion 33 is the same as a height h2 of the second protrusions 34.

A plurality of outer circumferential concave portions 37 which are recessed inwardly in the pipe diameter direction B are formed in the outer circumferential edge of the gland 17. As illustrated in FIG. 3 and FIG. 4, each outer circumferential concave portion 37 enters between one bolt insertion hole 32 and an adjacent bolt insertion hole 32 from the outer circumferential edge of the gland 17.

A width W1 in the pipe diameter direction B from the inner circumference to the outer circumference of the first protrusion 33 is configured to be equal to or greater than a width W2 in the pipe diameter direction B from the outer circumference of the first protrusion 33 to the outer circumferential concave portion 37.

An inner circumferential surface 33a of the first protrusion 33 of the gland 17 is a tapered surface that increases in diameter progressively in the insertion direction C. As illustrated in FIG. 2, a diameter D2 of an end part 30a of the second tapered surface 30 on the opening end face 16 side of the socket 5 is smaller than an internal diameter D1 of the first protrusion 33 of the gland 17.

Figure 11:
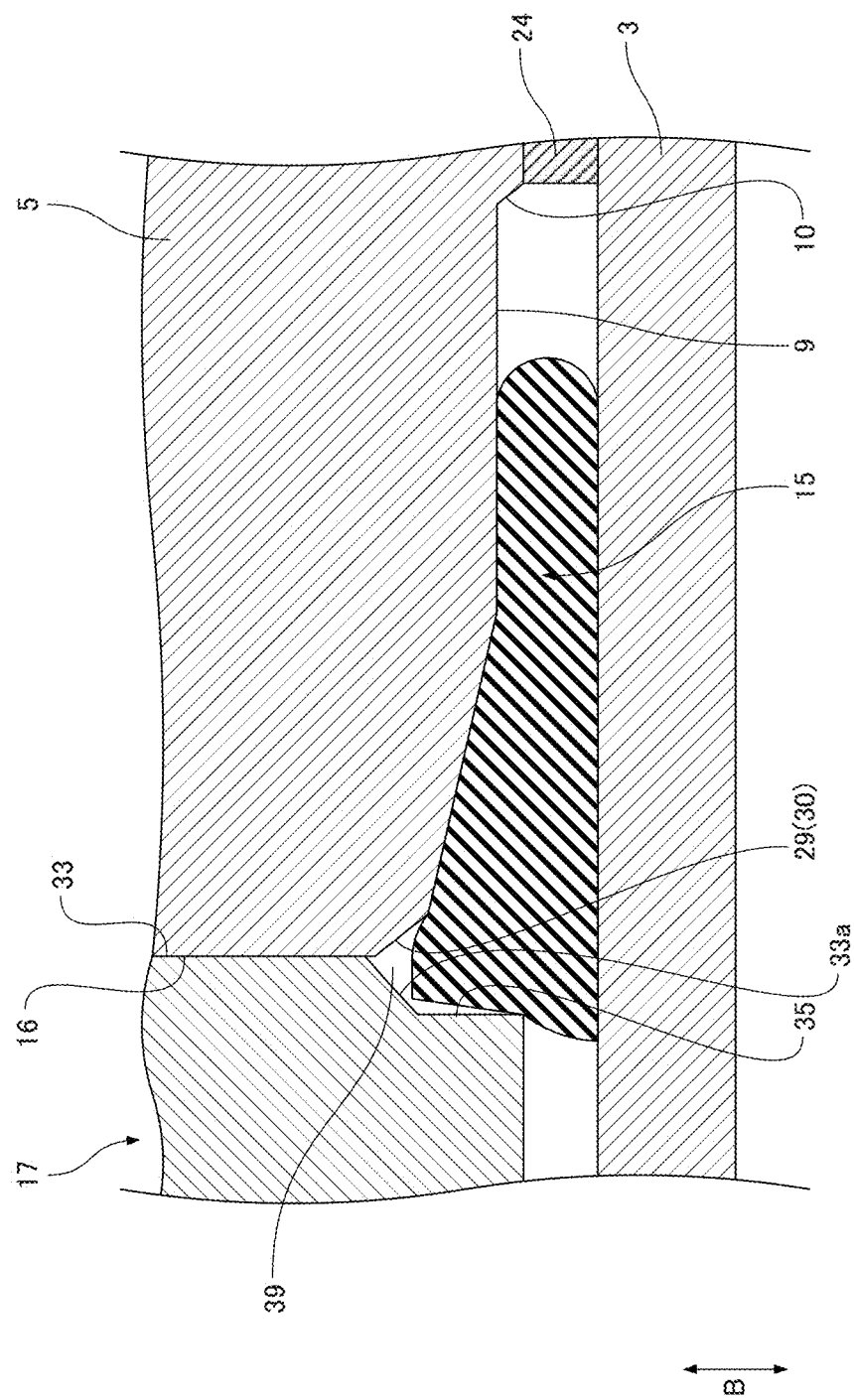
FIG. 11 is a partial enlarged cross-sectional view illustrating the method for joining pipes in the pipe joint in the first embodiment of the present invention, and illustrates a state when the seal member has been inserted into the seal member insertion space.

As illustrated in FIG. 1 and FIG. 11, a clearance 39 that is surrounded by the inner circumferential surface 33a of the first protrusion 33, the second tapered surface 30, and the outer circumferential surface of the base part 27 of the seal member 15 is formed throughout the entire circumference.

Further, as illustrated in FIG. 2 and FIG. 9, when the seal member 15 is inserted into the seal member insertion space 14 in a state in which the seal member 15 is externally fitted to the spigot 3, a bulb center part 41 of the bulb part 26 of the seal member 15 is located further inward in the pipe diameter direction B than the end part 30a of the second tapered surface 30 on the opening end face 16 side of the socket 5. Here, the bulb center part 41 is a central portion between the inner circumference and outer circumference in the pipe diameter direction B of the bulb part 26.

A method for joining the pipes 2 and 4 in the aforementioned pipe joint 1 is described hereunder.

First, the lock ring 22 is accommodated in the lock ring accommodating groove 11, and the diameter of the lock ring 22 is expanded by enlarging the width of the cut portion of the lock ring 22 using a diameter expander (not illustrated in the drawings).

Next, in a state in which the centering ring 24, the seal member 15, and the gland 17 are externally fitted to the one pipe 2, the spigot 3 of the one pipe 2 is inserted into the socket 5 of the other pipe 4. At such time, because the diameter of the lock ring 22 is expanded using the diameter expander as described above, the spigot protrusion 23 passes through the inner circumference of the lock ring 22 from the opening end face 16 of the socket 5, and reaches a position which is further toward the back side of the socket 5 than the lock ring 22.

Thereafter, by removing the diameter expander from the cut portion of the lock ring 22, the lock ring 22 decreases in diameter and presses against the outer circumference of the spigot 3.

Figure 7:
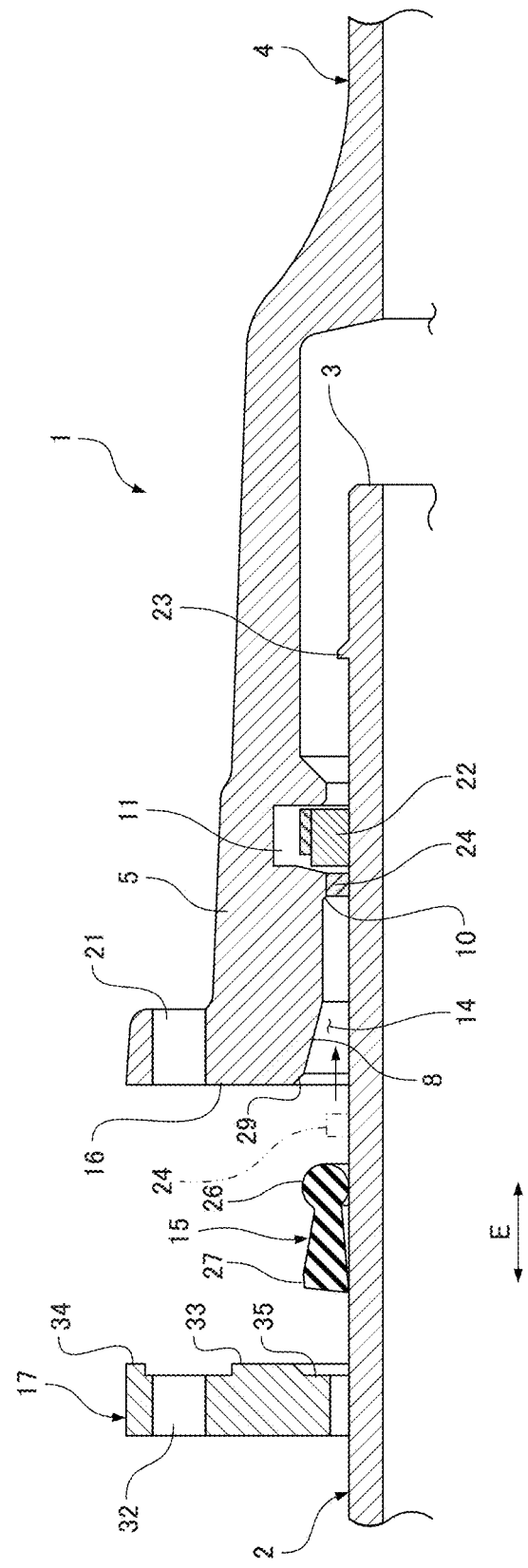
FIG. 7 is a cross-sectional view illustrating a method for joining pipes in the pipe joint in the first embodiment of the present invention.

Next, as illustrated in FIG. 7, the centering ring 24 is caused to slide in the pipe axis direction E, and enters between the inner circumference of the socket protrusion 10 and the outer circumference of the spigot 3. By this means, the spigot 3 is centered with respect to the socket 5, and a deviation between the central axis of the one pipe 2 and the central axis of the other pipe 4 substantially disappears.

Figure 8:
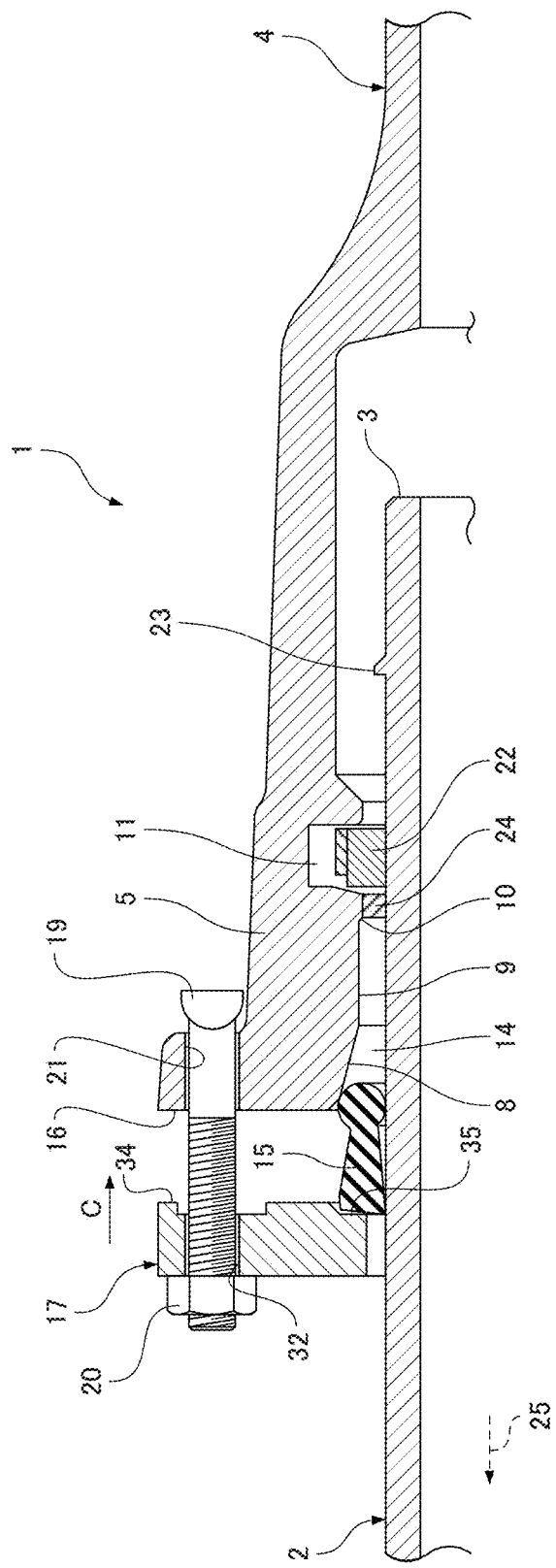
FIG. 8 is a cross-sectional view illustrating the method for joining pipes in the pipe joint in the first embodiment of the present invention.

In addition, as illustrated in FIG. 8 and FIG. 9, the other end part in the separation direction 25 of the base part 27 of the seal member 15 is fitted into the concave portion 35 of the gland 17, the T-head bolts 19 are inserted through the bolt holes 21 of the socket 5 and the bolt insertion holes 32 of the gland 17, and the nuts 20 are tightened onto the T-head bolts 19, and thereby the seal member 15 is pressed into the seal member insertion space 14 from the opening end face 16 of the socket 5 by the gland 17.

Figure 10:
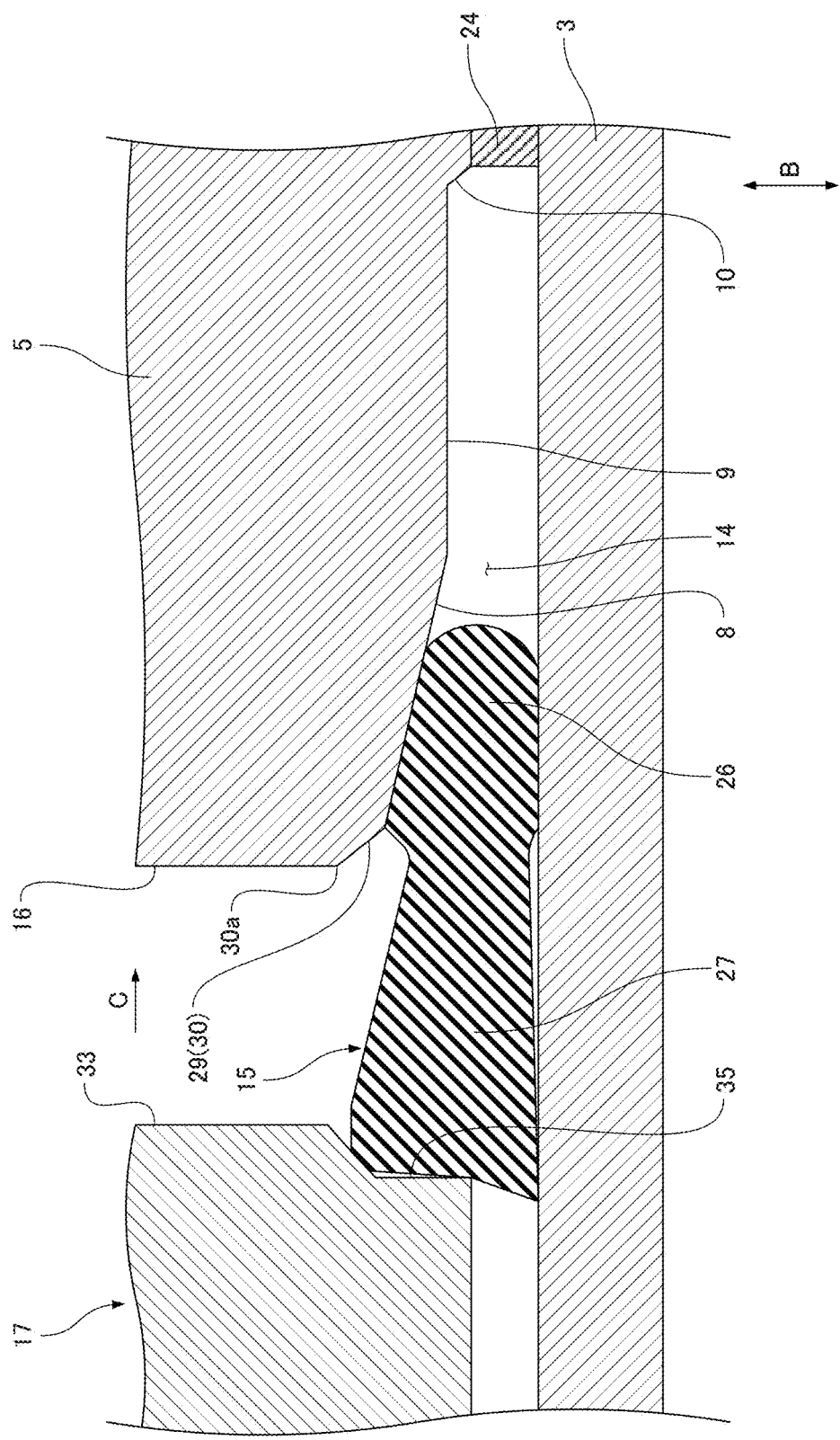
FIG. 10 is a partial enlarged cross-sectional view illustrating the method for joining pipes in the pipe joint in the first embodiment of the present invention, and illustrates a state in which the seal member is partway through the process of being inserted into the seal member insertion space.

At such time, as illustrated in FIG. 9 and FIG. 10, the bulb part 26 of the seal member 15 is guided from the opening end face 16 of the socket 5 into the seal member insertion space 14 by the second tapered surface 30 of the guide part 29.

Further, as illustrated in FIG. 9, because the bulb center part 41 of the seal member 15 is located further inward in the pipe diameter direction B than the end part 30a of the second tapered surface 30, in a case where the T-head bolts 19 and the nuts 20 are unevenly tightened in sequence from those bolts and nuts at the top to those bolts and nuts at the bottom when attaching the gland 17 to the socket 5, even if the seal member 15 stretches and slackens, the bulb part 26 is reliably guided from the opening end face 16 of the socket 5 into the seal member insertion space 14 by the second tapered surface 30 of the guide part 29, and the seal member 15 can be reliably pressed into the seal member insertion space 14 by the gland 17.

Therefore, there is no necessity to tighten the T-head bolts 19 and the nuts 20 in a manner so that the tightening torque is equal at all of the T-head bolts 19 and the nuts 20, and it is not necessary to control the tightening torque of the T-head bolts 19 and the nuts 20, and thus the time required for performing the work to tighten the T-head bolts 19 and the nuts 20 can be shortened.

Further, when the seal member 15 is pressed into the seal member insertion space 14 by the gland 17, because the other end part of the seal member 15 is fitted into the concave portion 35 of the gland 17, the other end part of the seal member 15 can be prevented from becoming misaligned and turning over in the pipe diameter direction B.

In addition, as illustrated in FIG. 11, even if the seal member 15 deforms outward in the pipe diameter direction B, by the seal member 15 escaping into the clearance 39, the occurrence of a situation in which the seal member 15 is pinched between the first protrusion 33 of the gland 17 and the opening end face 16 of the socket 5 can be prevented.

Furthermore, as illustrated in FIG. 1, when the T-head bolts 19 are inserted through the bolt holes 21 of the socket 5 and the bolt insertion holes 32 of the gland 17, and the nuts 20 are tightened to fasten the gland 17 to the socket 5, even if an excessive fastening force acts on the gland 17, because the first protrusion 33 and the second protrusions 34 each come in contact with the opening end face 16 of the socket 5, deformation of the gland 17 can be prevented.

Further, as illustrated in FIG. 3 and FIG. 4, since the plurality of outer circumferential concave portions 37 are formed in the outer circumferential edge of the gland 17, the weight of the gland 17 can be reduced in comparison to a gland in which the outer circumferential concave portions 37 are not formed.

Figure 6:
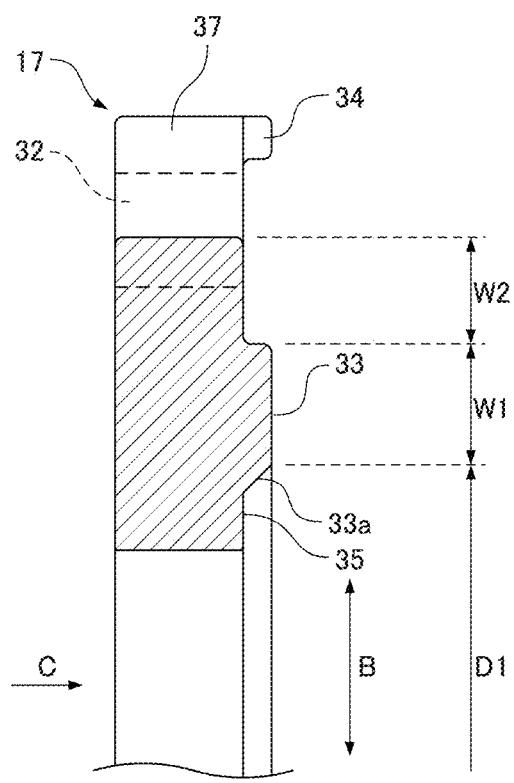
FIG. 6 is a perspective view along the direction of arrows Y-Y in FIG. 3.

In addition, as illustrated in FIG. 3 and FIG. 6, since the gland 17 is configured so that the width W1 from the inner circumference to the outer circumference of the first protrusion 33 is equal to or greater than the width W2 from the outer circumference of the first protrusion 33 to the outer circumferential concave portions 37, the strength of the gland 17 can be sufficiently maintained even when the plurality of outer circumferential concave portions 37 are formed in the outer circumferential edge of the gland 17.

Second Embodiment

Figure 12:
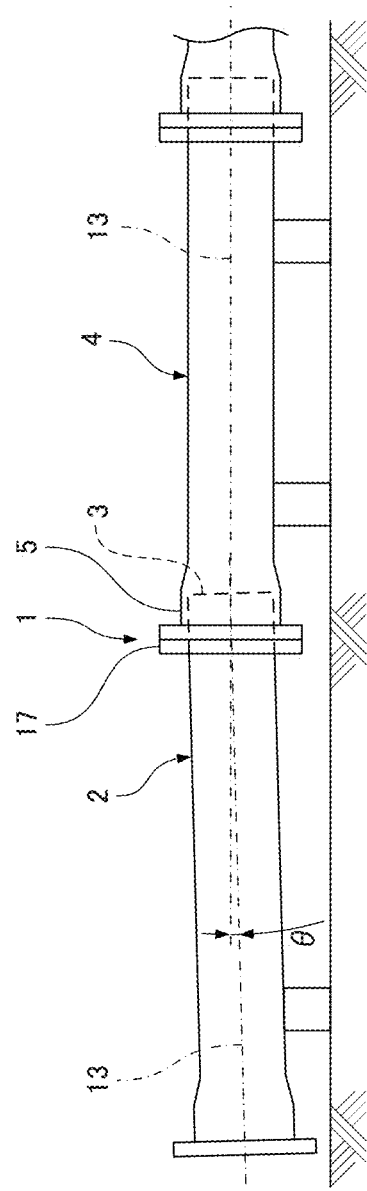
FIG. 12 is a view illustrating pipes that were bent and joined by a pipe joint in a second embodiment of the present invention.
Figure 13:
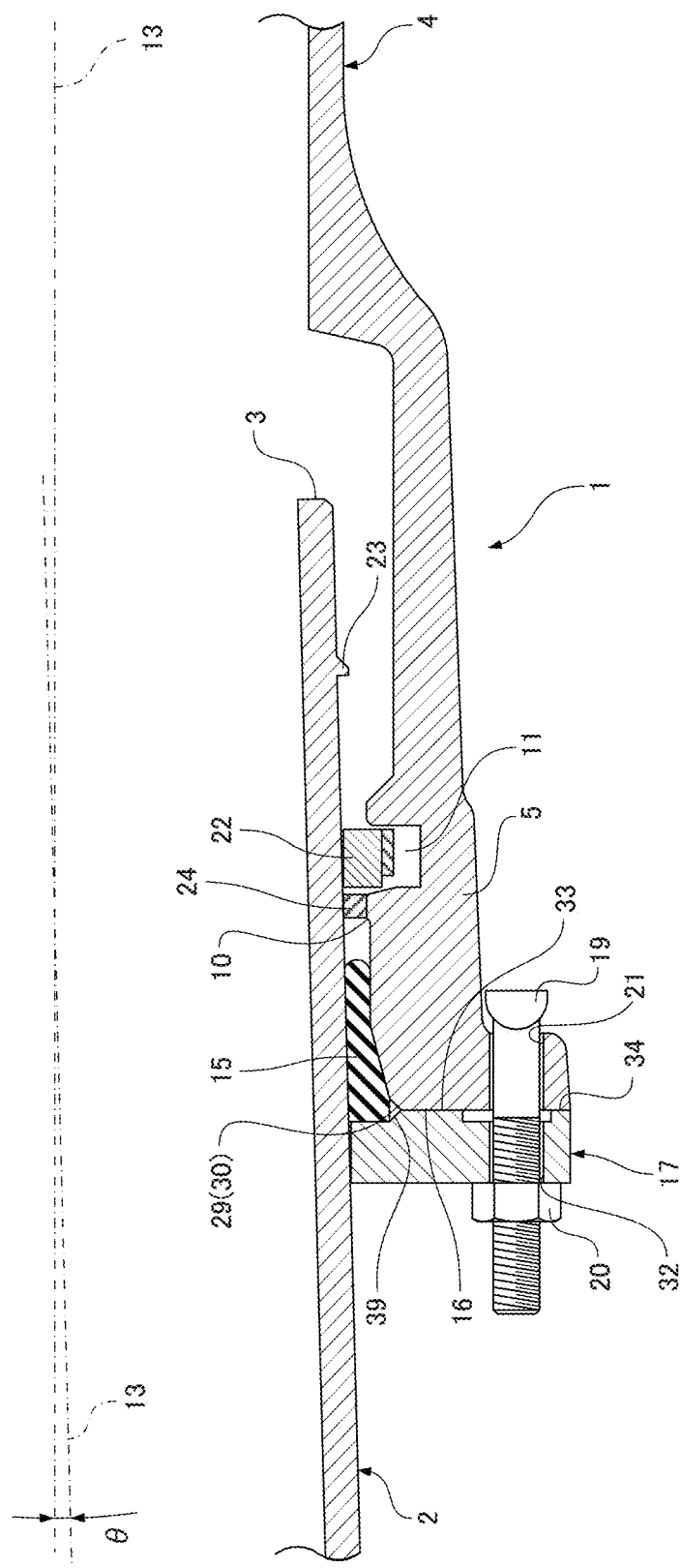
FIG. 13 is a cross-sectional view of a lower part of the pipe joint in the second embodiment of the present invention.

Although in the first embodiment that is described in the foregoing, as illustrated in FIG. 1, the one pipe 2 is joined in a straight fashion without bending to the other pipe 4, in a second embodiment that is described hereunder, as illustrated in FIG. 12 and FIG. 13, the one pipe 2 may be joined to the other pipe 4 in a state in which the one pipe 2 is bent at a predetermined bending angle θ. At such time, the one pipe 2 inclines so that the end part on the spigot 3 side is at a higher position than the end part on the opposite side.

The structure of the pipe joint 1 that joins together the pipes 2 and 4 bent in this manner is the same as the structure of the pipe joint 1 in the first embodiment that is described above (see FIG. 1).

When joining the one pipe 2 to the other pipe 4 in the pipe joint 1 of the second embodiment, in a state in which the centering ring 24, the seal member 15, and the gland 17 are externally fitted to the one pipe 2, the spigot 3 of the one pipe 2 is inserted into the socket 5 of the other pipe 4.

Figure 14:
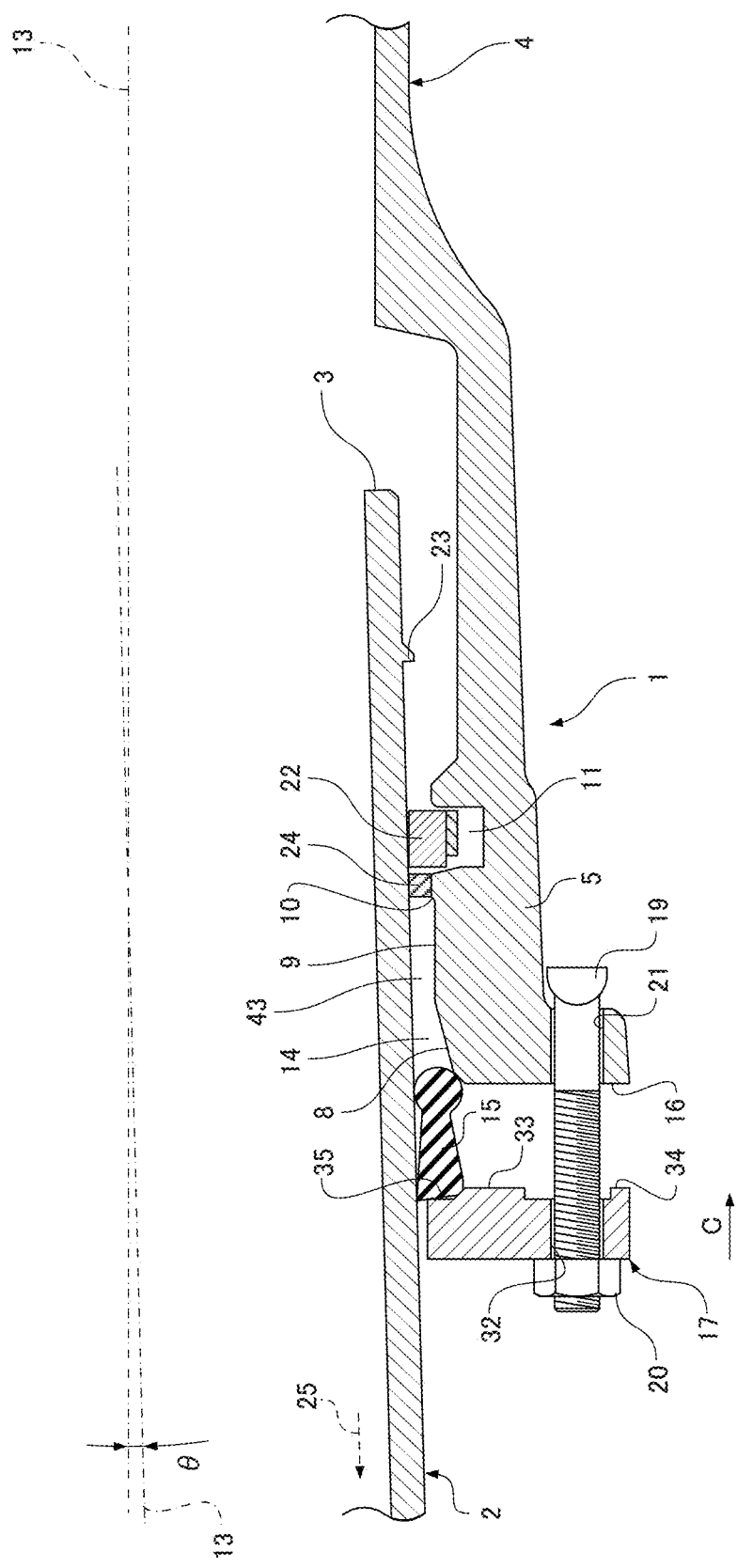
FIG. 14 is a cross-sectional view illustrating a method for joining pipes in the pipe joint in the second embodiment of the present invention.

Further, as illustrated in FIG. 14, after the centering ring 24 is caused to slide in the pipe axis direction E and inserted between the inner circumference of the socket protrusion 10 and the outer circumference of the spigot 3, the one pipe 2 is bent at a predetermined bending angle θ with respect to the other pipe 4.

At such time, because the spigot 3 is supported by the centering ring 24 and bends at the predetermined bending angle θ, a minimum clearance portion 43 where the clearance between the outer circumference of the spigot 3 and the inner circumference of the socket 5 is the minimum of an allowable range arises in the lower part of the pipe joint 1.

In such a state, the other end part of the base part 27 of the seal member 15 is fitted into the concave portion 35 of the gland 17, the T-head bolts 19 are inserted through the bolt holes 21 of the socket 5 and the bolt insertion holes 32 of the gland 17, the nuts 20 are tightened onto the T-head bolts 19, and the seal member 15 is thereby pressed into the seal member insertion space 14 from the opening end face 16 of the socket 5 by the gland 17.

Figure 15:
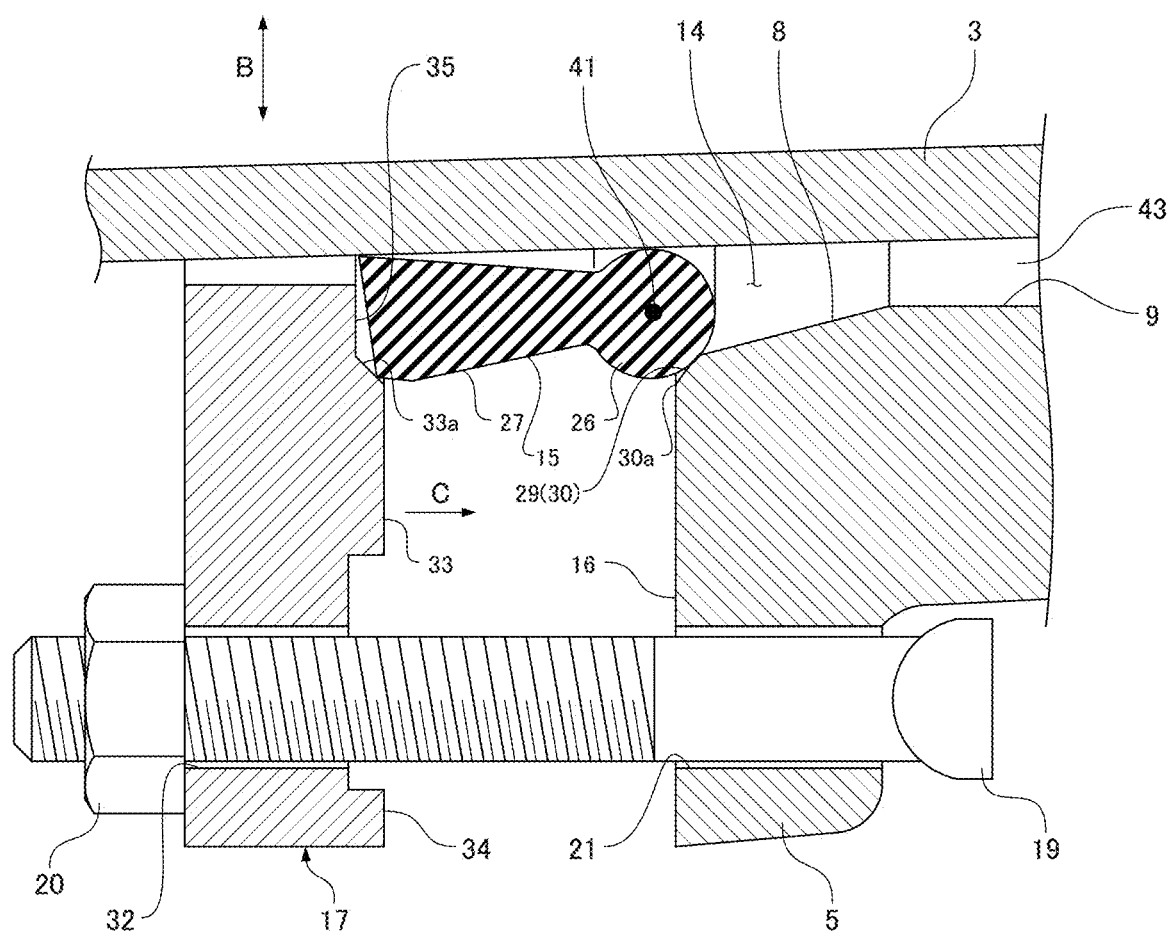
FIG. 15 is a cross-sectional view illustrating the method for joining pipes in the pipe joint in the second embodiment of the present invention, and is a view in which one portion in FIG. 14 is shown in an enlarged manner.
Figure 16:
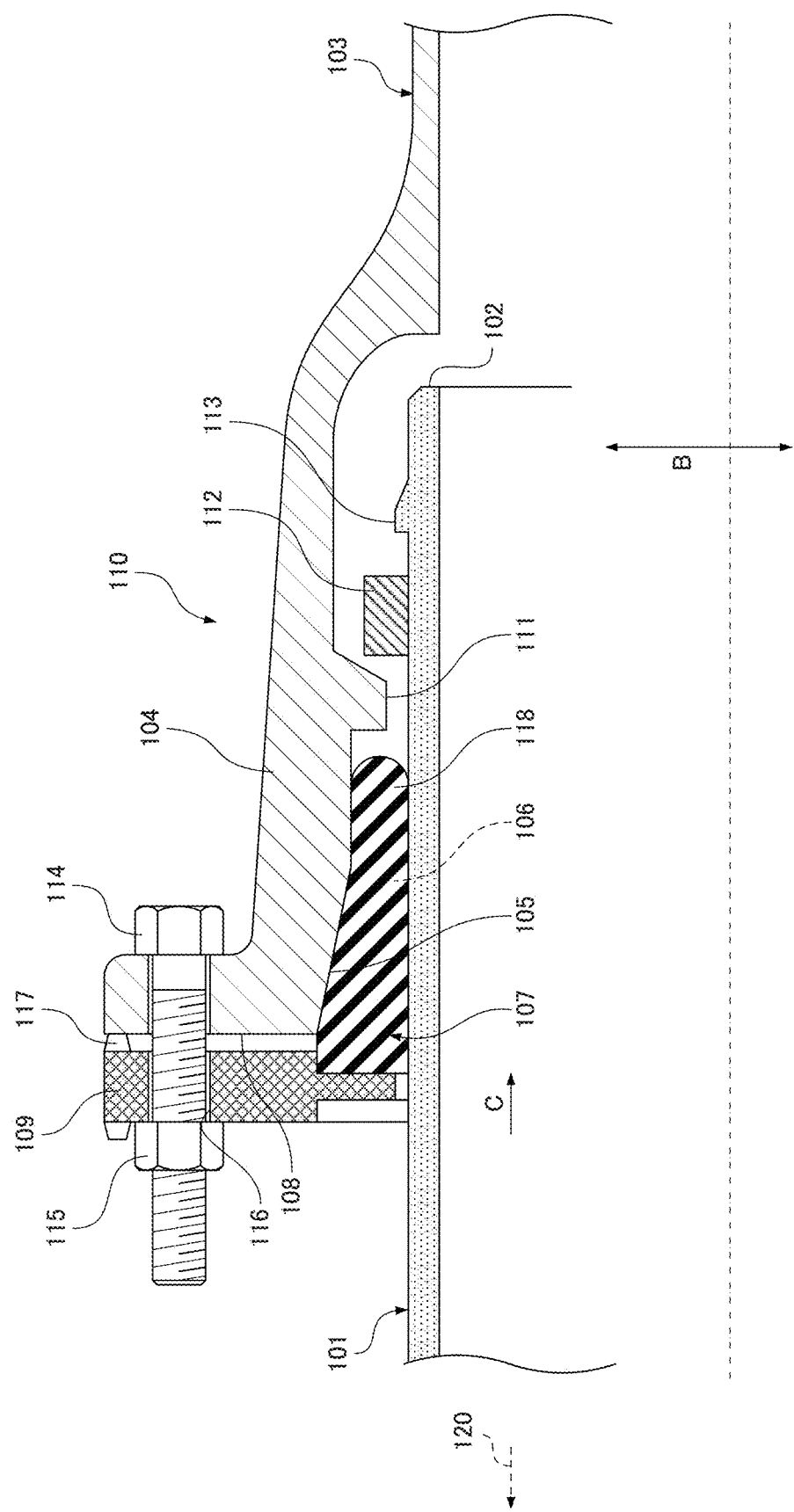
FIG. 16 is a cross-sectional view of an upper part of a conventional pipe joint.
Figure 17:
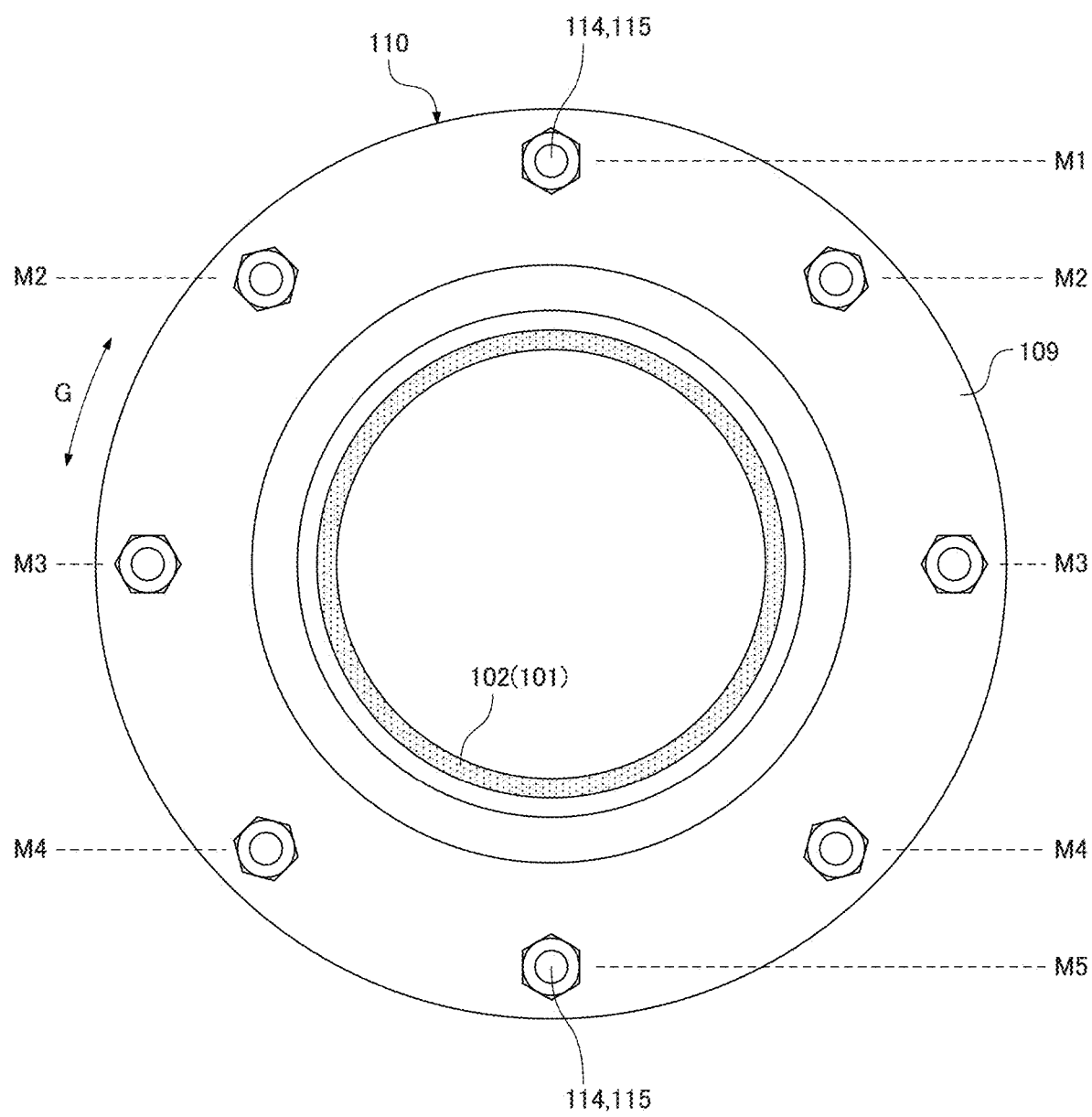
FIG. 17 is a view illustrating a conventional pipe joint as seen from the pipe axis direction of one pipe.
Figure 18:
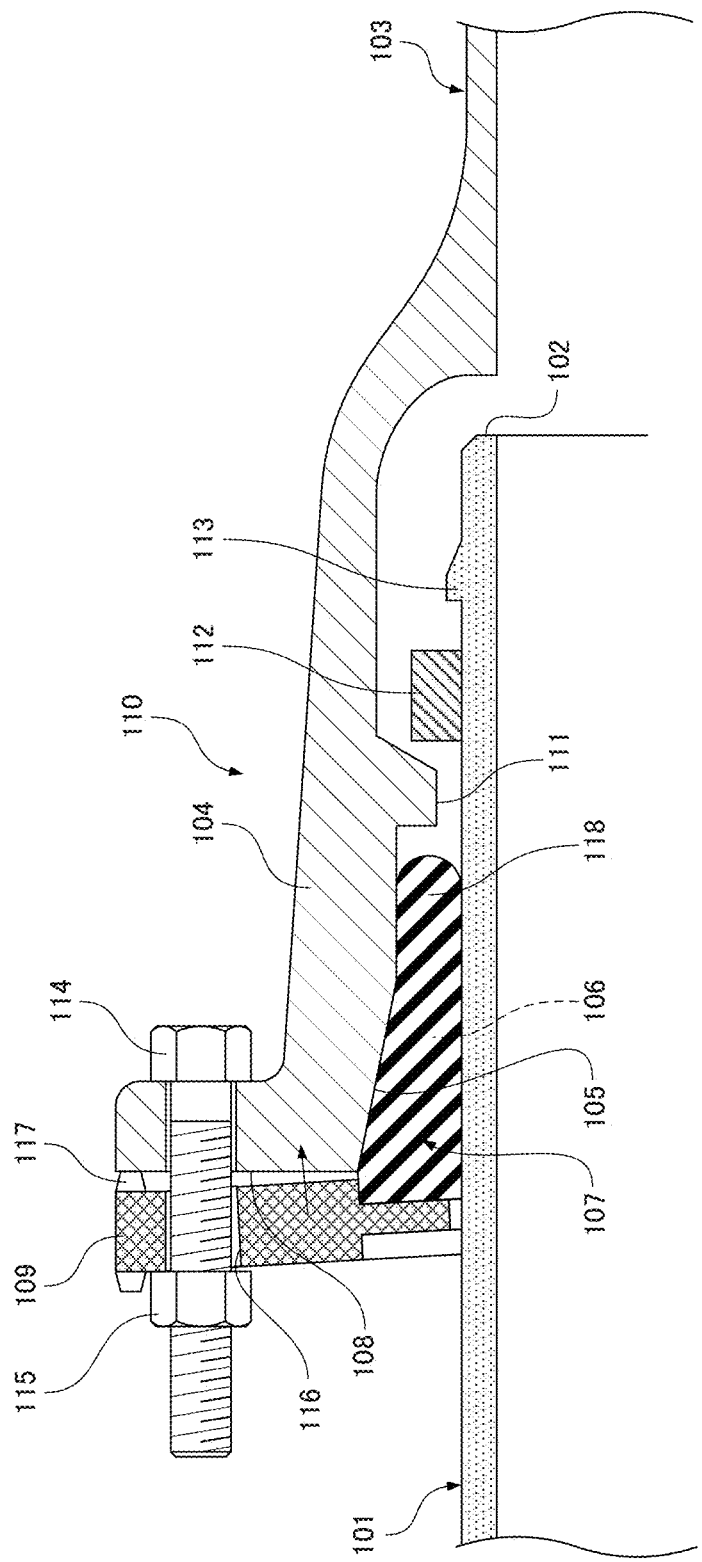
FIG. 18 is a cross-sectional view illustrating the upper part of the conventional pipe joint, which illustrates a state in which a gland is deformed.
Figure 19:
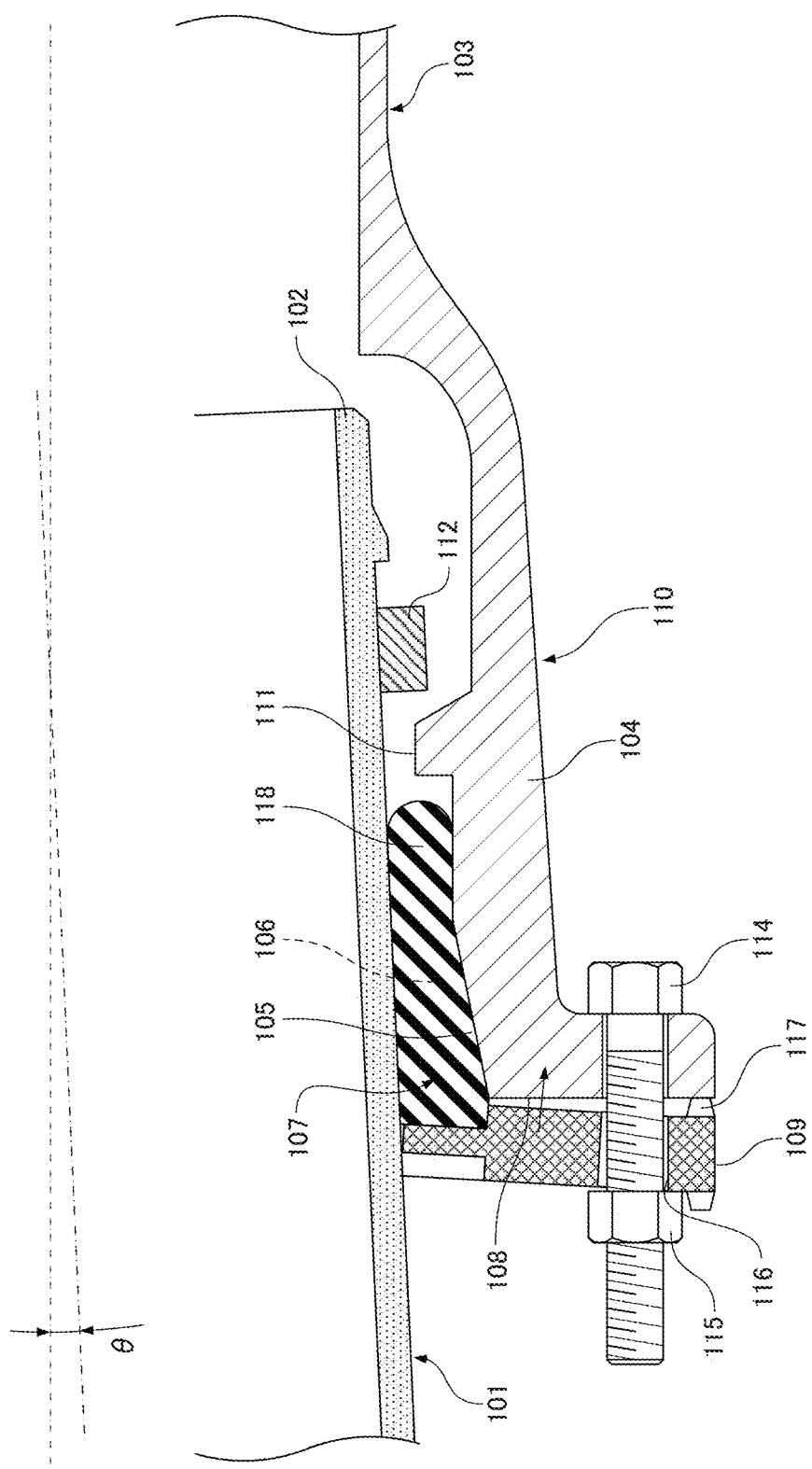
FIG. 19 is a cross-sectional view illustrating a lower part of the conventional pipe joint in a case where pipes were bent and joined, which illustrates a state in which a gland is deformed.

At such time, as illustrated in FIG. 15, the bulb part 26 of the seal member 15 is guided from the opening end face 16 of the socket 5 into the seal member insertion space 14 by the second tapered surface 30 of the guide part 29.

Further, in a case where the T-head bolts 19 and the nuts 20 are unevenly tightened in sequence from those bolts and nuts at the top to those bolts and nuts at the bottom when attaching the gland 17 to the socket 5, at the aforementioned minimum clearance portion 43 also, because the bulb center part 41 of the seal member 15 is located further inward in the pipe diameter direction B than the end part 30a of the second tapered surface 30, the bulb part 26 is reliably guided from the opening end face 16 of the socket 5 into the seal member insertion space 14 by the second tapered surface 30 of the guide part 29, and the seal member 15 can be reliably pressed into the seal member insertion space 14 by the gland 17.

Further, as illustrated in FIG. 13, even in a case where the outer circumference of the bent spigot 3 comes in contact with the inner circumference of the gland 17, deformation of the gland 17 can be prevented as a result of the first protrusion 33 and the second protrusions 34 respectively coming in contact with the opening end face 16 of the socket 5.

What is claimed is:

1. A pipe joint, wherein:
a spigot formed in one pipe is inserted into a socket formed in another pipe,
a first tapered surface that decreases in diameter progressively toward a rear side of the socket is formed on an inner circumference of the socket,
a seal member insertion space is formed throughout an entire circumference between the first tapered surface and an outer circumference of the spigot,
an annular seal member which seals between the inner circumference of the socket and the outer circumference of the spigot is inserted into the seal member insertion space,
a gland for pressing the seal member from an opening end face of the socket into the seal member insertion space is externally fitted to the spigot and faces the opening end face of the socket from outside,
the gland is attached to the socket through a plurality of fasteners,
the seal member has, at one end part in an insertion direction, a bulb part that is compressed in a pipe diameter direction and exerts a sealing function,
a guide part for guiding the bulb part of the seal member from the opening end face of the socket into the seal member insertion space is formed on the inner circumference of the socket,
the guide part has a second tapered surface which decreases in diameter progressively toward the rear side of the socket,
the second tapered surface is formed between the opening end face and the first tapered surface of the socket in a pipe axis direction,
an angle of inclination of the second tapered surface with respect to a pipe central axis is greater than an angle of inclination of the first tapered surface with respect to the pipe central axis,
a toric first protrusion integrally formed with the gland comes into contact with the opening end face of the socket,
a fastener insertion hole through which a fastener is inserted is provided in the gland,
a concave portion that is surrounded by the toric first protrusion is provided in the gland,
the first toric protrusion is formed further inward than the fastener insertion hole in the pipe diameter direction,
another end part in the insertion direction of the seal member is fitted into the concave portion of the gland, a diameter of an end part of the second tapered surface on the opening end face of the socket is smaller than an internal diameter of the toric first protrusion of the gland, in a case where the seal member is inserted into the seal member insertion space in a state in which the seal member is externally fitted to the spigot, a bulb center part between an inner circumference and an outer circumference in the pipe diameter direction of the bulb part of the seal member is located further inward in the pipe diameter direction than the end part of the second tapered surface on an opening end face side of the socket, a required space is formed between an end face of the spigot, an outer circumferential face of the spigot connected with the end face of the spigot, an inner circumference face of the socket, and a deep end side face of the socket, the spigot is movable in the required space in the pipe diameter direction and the pipe axis direction with respect to the socket, the one pipe and the another pipe are configured to be bendable to each other.

2. The pipe joint according to claim 1, wherein:

in a case where a minimum clearance portion where a clearance between the outer circumference of the spigot and the inner circumference of the socket is a minimum arises, a relationship that the bulb center part is located further inward in the pipe diameter direction than the end part of the second tapered surface on the opening end face side of the socket is also maintained in the minimum clearance portion.

3. The pipe joint according to claim 1, wherein:

a clearance that is surrounded by an inner circumferential surface of the first protrusion, the second tapered surface, and an outer circumferential surface of the seal member is formed.

4. The pipe joint according to claim 1, wherein:

a second protrusion that comes in contact with the opening end face of the socket is formed, and the second protrusion is formed further outward than the first protrusion in the pipe diameter direction.

5. The pipe joint according to claim 4, wherein:

the pipe joint comprises a plurality of the fastener insertion holes and a plurality of the second protrusions, each of the fastener insertion holes and the second protrusions being formed at predetermined intervals in a pipe circumference direction, each of the second protrusions is formed further outward than each of the fastener insertion holes in the pipe diameter direction, a plurality of outer circumferential concave portions which are recessed inwardly in the pipe diameter direction are formed in an outer circumferential edge of the gland, and the outer circumferential concave portion enters between the fastener insertion hole and an adjacent fastener insertion hole from the outer circumferential edge of the gland.

6. The pipe joint according to claim 5, wherein:

the gland is configured so that a width in the pipe diameter direction from an inner circumference to an outer circumference of the toric first protrusion is equal to or greater than a width in the pipe diameter direction from the outer circumference of the toric first protrusion to the outer circumferential concave portion.

* * * * *